United States Patent [19]

Cain et al.

[11] 4,084,381

[45] Apr. 18, 1978

[54] STABILIZATION OF EARTH SUBSURFACE LAYERS

[75] Inventors: Gene Cain; Joe Doyle Teague, both of Fort Worth; Paul James Wright, Euless, all of Tex.

[73] Assignee: Woodbine Corporation, Fort Worth, Tex.

[21] Appl. No.: 760,454

[22] Filed: Jan. 19, 1977

[51] Int. Cl.² ........................... E02D 3/14; E01B 1/00
[52] U.S. Cl. ..................................... 61/36 C; 61/36 B; 106/118; 106/119; 106/DIG. 1; 106/287.35; 238/2
[58] Field of Search ............. 61/36 B, 36 C; 106/118, 106/119, 287 SS, DIG. 1; 166/292; 238/2; 104/11; 404/75, 76

[56] References Cited

U.S. PATENT DOCUMENTS

| 707,840 | 8/1902 | Goldie | 104/11 |
|---|---|---|---|
| 2,815,294 | 12/1957 | Havelin et al. | 106/118 |
| 2,942,993 | 6/1960 | Handy | 61/36 R |
| 3,076,717 | 2/1963 | Minnick | 106/118 |
| 3,756,507 | 9/1973 | Hanig et al. | 238/2 |
| 3,852,084 | 12/1974 | Webster et al. | 106/287 SS |

FOREIGN PATENT DOCUMENTS

| 585,628 | 10/1959 | Canada | 61/36 B |
|---|---|---|---|
| 7,216,840 | 5/1972 | Japan | 106/118 |

*Primary Examiner*—Robert L. Wolfe
*Assistant Examiner*—A. Grosz
*Attorney, Agent, or Firm*—Wofford, Felsman, Fails & Zobal

[57] ABSTRACT

A method of treating subsurface layers of the earth to either control movement of the subsurface water or build strength of the subsurface layers, or both, characterized by injecting at a predetermined depth and at a plurality of predetermined, spaced apart locations a limefly ash slurry consisting essentially of water, particulate hydrated lime, particulate fly ash and a surfactant. Also disclosed are the preferred proportions, or concentrations, of the components of the slurry; and a finished product; such as, a railroad track subgrade and ballast supporting cross-ties and rails, the subgrade having been injected with masses of lime and fly ash slurry to leave residual masses of lime and fly ash disposed in fissures and any ballast pockets along the railroad track, the masses having a proportion of lime to fly ash in the range of one to 1:1 to 1:3.

15 Claims, 2 Drawing Figures

STABILIZATION OF EARTH SUBSURFACE LAYERS

BACKGROUND OF THE INVENTION

1. Field of the Invention

This invention relates to treating subsurface layers and treated subsurface layers, adjacent the surface of the earth, to either control movement of subsurface water or build strength of the subsurface layers, or both. More particularly, this invention relates to improving the subgrade; as for buildings, road beds, or the like.

2. Description of the Prior Art

The prior art is replete with a wide variety of materials that have been employed to stabilize soils, or improve subgrades in the subsurface layers adjacent the surface of the earth for a variety of purposes. The applications have been as varied as improving subgrades for streets, runways, railroads, dewatering projects and more recently, improving the slopes to prevent failure thereof. Of course, pretreating building sites for improving the strengths and water flow characteristics of soils has long been a problem plaguing the civil engineer and the architectural engineer. The problems have been varied and the techniques have been varied to try to overcome them. Lime slurries have been worked into the top layers; for example, the top several to as much as fourteen or more inches in depth to improve and stabilize soils, or subgrades. Other more exotic and expensive treatment, such as injection of furfural alcohols, that have been found to work in subterranean formations, have been tried. Such exotic treatments have proven too expensive and not altogether successful because of the lack of metamorphosed rock in the subsurface layers adjacent the surface of the earth. Expressed otherwise, these exotic treatments were infeasible and engineeringly inoperable because of the numerous small cracks, crevices and the like that traverse through soil and the soils were composed largely of sedimentary materials, amorphous materials, humous matter, non crystallographic materials and the like, that could not be considered as were the subterranean formation.

Preliminary work has indicated that a stabilizing method and the resulting stabilized layers adjacent the surface of the earth should provide one or more of the following features not heretofore provided by the prior art.

1. The injected materials should undergo a reaction with time to produce water-insoluble materials that will block the flow of water.

2. The injected materials should react with time to form materials that will strengthen the soil, or subsurface layers, into which they are injected.

3. The injected material should be in a slurry form so as to traverse along minute fissures, cracks and the like to obtain widespread stabilization effects.

4. The method should enable stabilizing railroad subgrades by injecting into the roadbed to control the flow of water and strengthen the subgrade.

5. The method should enable injection of a slurry into deep ballast pockets on a roadbed to displace the water, prevent re-entry of water and build to a strength greater than that initially occupying the ballast pockets.

6. The method should be useful in stabilizing slopes against slides, shear failure, slough offs, and the like.

7. The method should be amenable to a variety of injection techniques, depending upon the extent and grade of the slopes or the like.

8. The injection method should be useful for dewatering and cutting off subsurface flow of water, as into an excavation for a building, highway, and the like.

9. The method should be useful for remedial work around a home to stabilize the moisture content around the home foundations to prevent alternate drying and subsequent rewetting with attendant expansion and contraction of the soils so there will be less damage, such as cracking of the walls, foundation and the like.

10. The method should be usable as a thick grout to allow pumping through a hole to raise a slab for cosmetic effects, relevelling and the like.

It can be seen that the prior art has been deficient in providing an economical process that has one or more of the foregoing features.

SUMMARY OF THE INVENTION

Accordingly, it is an object of this invention to provide a method and resulting stabilized subgrades that are economical and provide one or more of the foregoing features not heretofore provided by the prior art.

It is the specific object of this invention to provide a method that is economical and provides a plurality of the features delineated hereinbefore and not heretofore provided.

It is also a specific object of this invention to provide a railroad subgrade that has been economically stabilized and provide a plurality of the features delineated hereinbefore and not heretofore provided by the prior art.

In one embodiment of this invention, there is provided a method of treating subsurface layers of the earth to perform one of controlling movement of subsurface water and building strength of the subsurface layers characterized by injecting at predetermined depth and at a plurality of predetermined, spaced-apart locations a lime-fly ash slurry consisting essentially of water, particulate hydrated lime, particulate fly ash and surfactant. In the preferred embodiment, the particulate lime and fly ash are present as particulate solids in a proportion within a range of 25–60 percent by weight of the water. The particulate solids comprise lime in a proportion of 25–50 percent by weight and fly ash in a proportion of 75–50 percent by weight.

In another embodiment of this invention, there is provided a railroad track comprising a subgrade; ballast along the top of the subgrade; cross-ties at predetermined spacing at the top of and in the ballast on top of the subgrade; a pair of rails carried by the cross-ties; and embodying the improvement of a plurality of injected masses of lime and fly ash and reaction product disposed in the fissures and ballast pockets along the railroad track. The masses of injected lime and fly ash have a proportion of lime to fly ash to 1:1 to 1:3.

DESCRIPTION OF THE PREFERRED EMBODIMENT(S)

Figure 2:
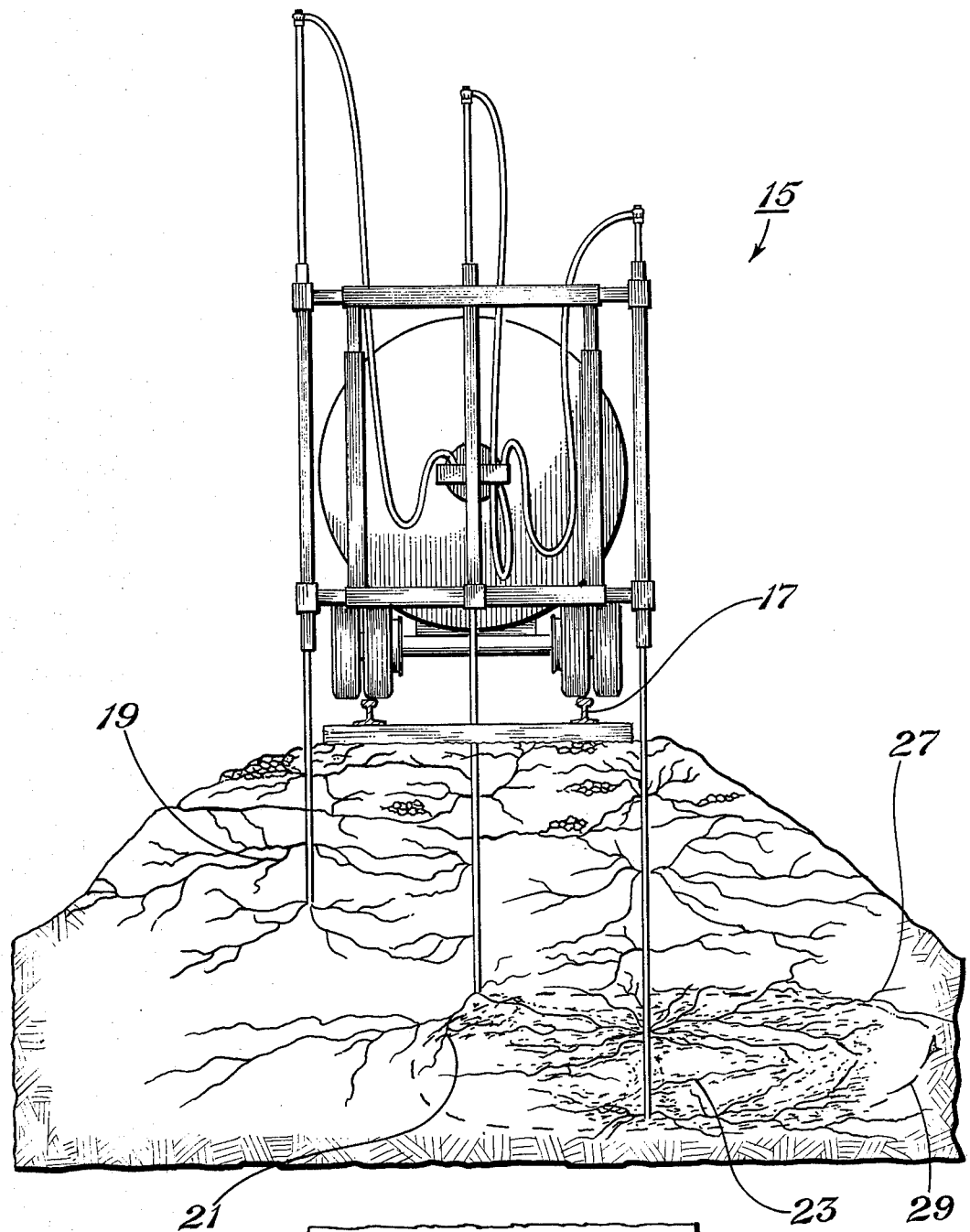
FIG. 2 is a partial cross-sectional view of a railroad track having a slurry of water, surfactant, lime and fly ash being injected to form in situ masses of lime, fly ash and reaction product along a railroad track.

As indicated hereinbefore and as will become clearer later hereinafter, this invention can be employed in a wide variety of circumstances for improving the subsurface layers by either controlling the movement of subsurface water or building the strength of the subsurface layers, or both.

The water that is employed in the slurry that is injected into the subsurface layers may be any of the water from economical and normally employed sources. If the water is to be displaced into a potable source of water, it should be potable itself, since the lime and fly ash do not ordinarily render it non potable; particularly, after the water has been passed through the soil. Usually, the job will be close enough to a conventional water supply that the conventional source of water can be employed. A conventional source may comprise city water mains, railroad storage facilities, highway department storage facilities, lakes, streams and the like. Preferably the water will not have a high concentration of materials that would react with the lime that will be added in the slurry.

The lime that is employed in the slurry may be one of the conventional limes, such as a dolomitic lime or a high calcium lime, more accurately referred to calcium hydroxide. The lime that is employed may have minor amounts of other impurities therein, but will ordinarily analyze better than 70 percent by weight calcium oxide and better than 20 percent by weight combined moisture. The lime is particulate lime, preferably small particles. By small particles is meant particles that will all pass through a 50 mesh standard screen and more than 95 percent of which will pass through a 100 mesh screen. As will be discussed in more detail later hereinafter with this concentration of calcium hydroxide, the lime will react in time with the fly ash in the slurry to form a relatively high strength cement-type material in the soil.

The fly ash that is employed in the slurry is a pozzolanic by-product of coal-burning power plants. Preferably, the fly ash is of the "self-hardening type". Expressed otherwise, the fly ash has enough lime in it to harden if compacted after being moistened and form a water impervious mass. To accomplish this, the fly ash should have an analysis in excess of 5 percent by weight of unslaked lime, or CaO; preferably, more than about 10 percent by weight thereof. The fly ash should have less than 2 percent by weight of carbon and should have no greater loss on ignition than 2 percent by weight. Table 1 hereinafter gives a typical chemical composition. In Table 1 the concentration is given in percent by weight (% by wt.)

TABLE I

Fly Ash Typical Analysis

| Component | Concentration (% by wt.) |
|---|---|
| $SiO_2$ | 51.0% |
| $Al_2O_3$ | 18.0 |
| $Fe_2O_3$ | 5.0 |
| CaO | 20.0 |
| MgO | 3.5 |
| $SO_3$ | 1.0 |
| $Na_2O$ | 0.5 |
| $K_2O$ | 0.5 |
| Loss on ignition | 0.5 |
| Specific Gravity | 2.50 |
| Retained on #325 sieve | 24% |

TABLE I-continued

Fly Ash Typical Analysis

| Component | Concentration (% by wt.) |
|---|---|
| Surface are ($cm^2/cm^3$) | 6300 |

The fly ash is particulate, preferably small particle size. In the fly ash only one percent is retained on a 50 mesh screen, 96 percent passing through 100 mesh.

One of the chemical reactions that occurs when hydrated lime and fly ash are injected into subsurface layers, or soils, is the cementing action, commonly referred to as pozzolanic reaction. The aluminous and siliceous minerals normally contained in the solids are enhanced by the addition of the fly ash which is composed largely of silicas and aluminas. The abundance of the silicas and the aluminas increase the cementing action with the hydrated lime. The resulting reaction product is water insoluble and renders the fissures that formerly served as flow paths impervious to the subsurface flow of water, or moisture. In addition, the materials that are formed stabilize the soils to prevent slope failures, stabilize the soil for building foundations and performs other features delineated hereinbefore. To get the slurry into the small interstices of the subsurface layers, however, it is necessary to employ a surfactant.

The surfactant that is employed in the slurry is preferably a nonionic type surfactant, although the cationic and anionic type surfactants can be employed. The nonionic surfactants are usually the polyethylene oxide surfactants. By polyethylene oxide surfactants is meant a surfactant molecule in which the polyethylene oxide groups are combined in an average number with a moiety that is selected from the class consisting of alkyl or alkyl aryl type moiety. Illustrative of the alkyl type moieties are the hydrocarbon moieties having six to eighteen carbon atoms. Illustrative of the alkyl aryl moieties are the alkyl groups having six to twelve carbon atoms combined onto a phenyl ring. A typical nonionic surfactant is nonyl phenol with an average from eight to one hundred mols of ethylene oxide associated with each mol of nonyl phenol. Typically, an average of about 30 mols of ethylene oxide will be associated with each mol of nonyl phenol. If desired, of course, the octa-heptyl-, or hexyl- moieties may be associated with the phenol and employ from eight to one hundred mols of ethylene oxide in association therewith, depending upon the hydrophillic versus hydrophobic characteristics desired.

The nonionic surfactant that is employed in the Examples herein is the Wet-It surfactant, Chemical Research, Inc., Dallas, Tex.

As indicated, the anionic surfactants such as sodium lauryl sulfate and the cationic surfactant such as cetyl pyridinium chloride can be employed if desired.

The surfactant may be employed in a concentrated form or may be diluted and applied in an aqueous solution, the latter facilitating forming the slurry.

In the slurry of this invention, the particulate lime and the particulate fly ash are present as particulate solids in a proportion within a range of 25–60 percent by weight of the water. Of the particulate solids, the lime comprises about 25–50 percent by weight and the fly ash comprises a proportion of in the range of about 75–50 percent by weight. Preferably, the lime is employed in about one third of the particulate solids and the fly ash comprising the remaining two thirds of the particulate solids. Expressed otherwise, the slurry is prepared by adding an amount in the range of about 2½ to 3 pounds of the particulate solids per gallon of water; the latter where the particulate solids comprise about one pound of lime and about two pounds of fly ash.

The surfactant is employed in a concentration of at least 0.001 percent by volume preferably, at least 0.01 percent by volume. The best concentration of surfactant that has been achieved is in the range of 0.01–1 percent by volume of the slurry; preferably by 0.03 percent by volume. Expressed otherwise, the liquid surfactant is employed in a proportion of about 1 part to about 3500 parts of slurry when the liquid is undiluted surfactant.

The remainder of the slurry is water.

The slurry will be made more viscous if it is to be employed as a grout or for filling deep ballast pockets underneath railroads or the like. That is, the higher proportion of about 60 percent by weight of solids will be employed in the slurry for such applications, or uses.

In operation, this invention is performed similar to the lime slurry injection described by inventors in a series of publications as follows:

"Lime Slurry Pressure Injection Tames Expansive Clays", Paul J. Wright, CIVIL ENGINEERING-CE, October, 1973.

"Lime Injection Production Equipment and Techniques" Paul J. Wright, ROADBED STABILIZATION AND LIME INJECTION CONFERENCE, Little Rock, Ark., University of Arkansas and the Federal Railroad Administration, August, 1975; and "Roadbed Stabilization by Lime Slurry Injection" RAILWAY TRACK AND STRUCTURES, October, 1975, an address presented at the LIME INJECTION CONFERENCE.

Injection rigs were developed to inject the lime-fly ash slurry into the ground without requiring pre-drilled holes, although the drilling of the holes and injecting by way of the holes can still be performed if desired. Ordinarily, the lime-fly ash slurry will be injected in a pre-patterned array of holes at predetermined spacing in the neighborhood of from 1 to 10 feet apart. For example, it has been found that injection on about 5 foot centers in both lateral and longitudinal directions affords a good interlacing injection pattern that accomplishes the objectives.

Before the injection actually takes place, however, several soil samples are taken to determine the best slurry to be employed based upon compatibility tests that are run with the sample. Several approaches have been employed, but the preferred one is to remold the soil samples, then after curing they are soaked in water for twenty-four hours and tested with a pocket penetrometer. Comparison of the control sample with the sample that has been treated with the lime-fly ash slurry, alone or in combination with the lime slurry, gives an idea of how reactive the soil is with the respective slurries. This simple test in no way is intended to replace the need of consulting with independent soil testing laboratories and engineers but is done as a safeguard to insure that the injection program is appropriate for the site.

After this determination is finished, one or two bulk mixing tanks are placed on the job as close as possible to the site, or area, where the injection is to be made. The mixing tanks are also preferably located near water and an all weather road surface so that bulk lime and fly ash deliveries can be made regardless of the weather. The mixing tanks may be any size. We have employed ten foot by thirty foot tanks. This size allows mixing an entire 20 ton load of solids at one time, assuring a uniform mixture for each load. Each of the slurry tanks are equipped with mechanical agitators to keep the lime and fly ash in suspension.

In some instances, the bulk slurry tank can be positioned next to a railroad track where the slurry is to be pumped directly along a railway subgrade. If this is not possible, 4000 gallon transports are employed to deliver the slurry to rail mounted injection equipment if it is to be injected along a railway.

The injection truck is a self-contained unit equipped with 2000 gallon slurry tank, high pressure pump, engine and three injectors at predetermined spacing and capable of making penetrations up to ten feet or more in depth. With optimum planning and disposition, 500 to 600 track feet per day of railroad can be injected with a single mixing tank or 600–800 track feet per day with two mixing tanks. Ordinarily, a rail and standardly equipped injection truck can also double for injection on a site not along a railway. The injection is carried out; for example, at 5 foot spacings over the area to be injected. The lime-fly ash slurry is forced into crevices, and out into the soil through the injector; which may be, for example, 1⅜ inches in outside diameter. The slurry containing the lime and fly ash is distributed in a 360° radius from the injection hole. The injection is ordinarily carried at one or more predetermined depths along the injection hole; for example up to 10 feet in depth. New injection systems are being developed that will allow injection up the the depths of 20 feet or greater. Injections are made incrementally on the way down, each injection being to refusal point in each increment. By refusal point is meant the point at which the soil will not take any more lime-fly ash slurry without the pressure exceeding the rupture pressure of the soil at the particular depth. In most soils the incremental level is separated from 18 inches to 24 inches in order to get a seal to be able to pump more slurry into the soil.

As previously mentioned hereinbefore, the chief culprit in subgrade instability is water. Excess water in a subgrade usually manifests itself in problems referred to variously as "soft track", "pumping", "squeezes", "slides", "slope failures", and "out of face track". The water may penetrate the subgrade from surface rain, by capillary rise from below and from lateral movement, especially in areas of side hill cuts. Water is easily trapped in the soil if the grade changes and improper drainage results in excessive soaking of the subgrade. Along railroad tracks there are deep ballast pockets that resemble bathtubs up to 10 or even 18 feet in depth. The water creates a moggy, unstable subgrade into which the ballast sinks as rapidly as it is applied so it is substantially impossible to stabilize the railroad track for any extended period of time with this "puddle" of water held in place. Heretofore, advent was had to putting the track out of service and digging out the deep ballast pockets. This was a very time consuming and expensive procedure, both from the direct expense and indirect expense point of view.

This invention is advantageous in that the lime-fly ash slurry can be injected to displace the water from these "puddles" whether they be relatively minor puddles or deep ballast pockets. The lime-fly ash then begins its cementing action and sets up. The setting solids prevent re-entry of water and build a strong stable subgrade.

In other applications, in long dry spells soils become excessively dry, particularly roadbeds. There may result surficial cracks that make the soils or subgrades subject to rapid soaking from heavy rains. This is at least disturbing because of the expansion of the clays in a building site but it can be tragic if a derailment occurs along the roadbed or the like that suffers failure.

This invention is useful in that a series of injections around the periphery of an area can control the moisture therewithin. Expressed otherwise, a desired moisture content within the area is controlled since moisture is prevented from entering or leaving the area laterally. This allows stabilizing the soil beneath a house, or other existing structure to prevent alternate drying and rewetting with concommitant expansion and contraction. On the other hand, where water is desired to be kept out of an area, as in a building excavation, injection of the lime-fly ash slurry in accordance with this invention forms a water impervious barrier around the area to impede the movement of moisture into the area. The exact chemistry that takes place when the lime-fly ash slurry is injected into the soil is not completely known or understood. It is known that in heavy clay soils, the lime-fly ash flows through the available fractures in the soil forming a network of lime-fly ash seams. The lime and fly ash form cement as a reaction product in time. These seams become impervious moisture barriers that impede the movement of moisture through the soil. These seams actually thicken or grow by calcium ion exchange to a total thickness of about three inches or more over a period of one year. These seams add strength to the fractured area of the soil mass, in addition to controlling the flow of water through the subgrade. Many times during injection, clear water will be observed flowing out the side of a roadbed at the bottom of a fill as the water is replaced by the lime-fly ash slurry.

Moreover, recent tests have been completed on many of the jobs that we have formed and show that the soil between the lime seams is also affected. Specifically, the swell of the clay is reduced and the strength of the soil is increased. In addition, the lime-fly ash shows an improvement in both strength and economy over lime slurry alone in most soils containing sand, sandy clays or sandy-silty clays.

Figure 1:
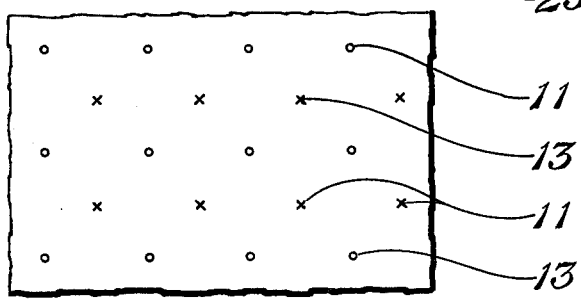
FIG. 1 is a partial plan view of an injection pattern for staged injections, the initial injection being in a substantially square pattern and subsequent injection being at diagonally intermediate locations.

As indicated hereinbefore, the lime-fly ash slurry is prepared by adding about 2½ to 3 pounds of solids per gallon of water. If the slurry is to be employed as a grout, about 60 percent by weight by solids is employed. The lime usually will make up about one-third and the fly ash will make up about two-thirds of the solids. The surfactant is then added to the slurry of the solids in the water in the proportion of about 1 part surfactant to 3500 parts of slurry, the parts being on a volume basis. The slurry is then injected as described hereinbefore. After from one to several days to allow time for the initially injected slurry to set and partially cure, a second set of injections may be made with either lime-fly ash slurry or lime slurry alone. Ordinarily, to complete a job the second injection will be made at the same spacing but off-set intermediate the other holes; for example, at five feet intervals spaced 2½ feet center line spacing off of the original 5 foot spacing and at the midpoint diagonally between the preceding injection holes. As illustrated in FIG. 1, the initial injections may be made at injection points 11 (shown in the circles) with subsequent, staged injection being at the points 13 (shown in x's).

In the injection along the railroad track, the holes may be aligned along the longitudinal axis of the track, or off-set by 2½ feet. As illustrated in FIG. 2, the injection apparatus 15 may be rolled along the railroad track 17 to inject the slurry of water, surfactant, lime and fly ash into relatively shallow injection locations 19, intermediate depth locations 21 or deeper locations 23. The injected masses of slurry of lime fly ash ultimately form injected masses of lime and fly ash and reaction products that are disposed in numerous fissures 27 and in any ballast pockets, shown by dashed lines 29. As indicated hereinbefore, these ballast pockets 29 may initially occur below the surface of the track, but eventually may extend to the surface such that they become sinks for the ballast if not treated by a method such as the method of this invention.

If the injection is made along a slope to stabilize the slope against slides and the like, a stage of injection may be made along the toe of the slope first, then move upwardly along the face and finally along the top of the slope. The injection may be of a lime-fly ash slurry as a first injection followed by a lime slurry at diagonally intermediate points. The lime and fly ash cement together for strength in the soil and fill the fissures. The lime slurry injected diagonally therebetween displaces water and decreases the plasticity of the soil. In addition, it may also react with certain components of the soil to help add strength. On the other hand, the lime-fly ash slurry can be injected as both a first and second injection if desired.

On some slopes the injection may be made from the top downwardly along the slope. If desired, individual injections can be made at depths up to 50 feet deep by adding to the injection pipes, or injectors.

In any event, the injected lime-fly ash slurry displaces the water from the soil, controls flow of water through the soil, reacts to cement together constituents and form a high strength, water impervious subsurface layer that is beneficial by one or both of the phenomena of controlling the flow of water and building the strength of the soils.

In addition, this invention can be made with a high solids slurry and employed as a grout to allow pumping through a hole in a slab or the like to raise a slab for cosmetic effects, for relevelling, and the like. It can be employed to stabilize runways for airports, streets, aircraft parking ramps, and other beds such as concrete roads.

The following examples are given to illustrate some uses of this invention.

EXAMPLE I

In this example, this invention was employed to control the flow of water.

A large chemical company had given a contract for excavation for partly burying huge storage tanks. The excavation had been impossible to complete because water flowed in to the area more rapidly than available pumps could pump it out. The large water flow was caused by a sand lens about 6 to 10 feet thick that acted as a conduit to "pipe in" the water. The excavation had to be 15 feet deep and about 350 feet square, so it was most difficult to perform. In accordance with this invention, a lime-fly ash slurry having therein three pounds of solids per gallon of water was injected. The solids were formed by 25 percent by weight lime and 75 percent by weight fly ash. One part surfactant was employed to 3500 parts of the slurry. The lime-fly ash slurry was injected around the construction site and into the sand lens throughout its depth at about 5 foot intervals. The injection was followed after several days by injection of a lime slurry at diagonal intervals. The following day the excavation was able to be completed because the water flow had been cut sufficiently that it could be kept pumped out. This is the same approach that is employed in injecting along a hard pan to prevent flow of water from undermining railroad beds and the like.

EXAMPLE II

In this example, this invention was employed to build soil strength and thereby control sloughing of a slope.

A large manufacturing concern had, in the process of building a plant, constructed a large slope. About a year later they had lost the entire slope and had restored it again. On a subsequent inspection it was found to be cracked, making it subject to water entering on the next rain with the danger of increasing the plasticity of the soils and again losing the slope. As the slope was endangered, it also endangered a foundation for a fuel storage tank that was employed. The method of this invention was carried out by first injecting lime-fly ash slurry. The lime-fly ash slurry was formed by employing three pounds per gallon of solids that were one-third lime and two-thirds fly ash. The surfactant was added in the same proportion as in Example I. The injection was carried out by first injecting at five foot centers to ten foot depths along the toe of the slope and working up the slope with double staged injection. Finally injection was made along the top. This was followed by a lime slurry diagonal injection as described hereinbefore.

Although the face of the slope was injected only part of the way, since there was a power line overhead, the injection was done every 20 feet for three aligned injections at 5 foot intervals and then moved up 5 feet and repeated until a closure was obtained on either side of the power line.

The slope has not been lost and is still stabilized since the injection was carried out.

EXAMPLE III

In this example, this invention was employed to both control flow of water and build roadbed strength.

Railroad mounted equipment was employed to inject the lime-fly ash slurry formed in accordance with Example II into the roadbed, or subgrade, along the railroad right-of-way. The injection was carried out at depths up to 10 feet. Water could be seen being displaced from the subgrade. The ballast pockets were filled with the lime-fly ash slurry and stabilized without putting the track out of service and without the expense of having to dig out the ballast pockets.

In the ensuing months since the stabilization was carried out, the railroad has been free of track failures and expensive repairs of crews having to remove ballast pockets or otherwise stabilize the railroad track.

It should be kept in mind that the examples given herein have not been exhaustive and that a plurality of injection sequences may be employed as necessary to obtain very high strength foundations for certain building sites subject to heavy loading or to otherwise effect the desired engineering results. Where such multiple series are to be employed, at least 48 hours should be allowed after the initial injection.

From these and other tests, it can be seen that this invention effects the objectives delineated hereinbefore and provides a method and stabilized roadbed that has one or more of the features delineated as desirable and not heretofore provided.

Although the invention has been described with a certain degree of particularity, it is understood that the present disclosure is made only by way of example and that numerous changes in the details of construction and the combination and arrangement of parts may be resorted to without departing from the spirit and the scope of this invention.

What is claimed is:

1. A method of treating sub-surface layers of the earth for controlling movement of sub-surface water and building strength of said sub-surface layers comprising injecting at a plurality of predetermined depths and at a plurality of predetermined, spaced-apart locations a lime-fly ash slurry consisting essentially of water, particulate hydrated lime, particulate fly ash and surfactant; said particulate lime and fly ash being present as particulate solids in a proportion within the range of 25–60 percent by weight of said water; said particulate solids comprising lime in a proportion of 25–50 percent by weight and fly ash in a proportion of 75–50 per cent by weight; and said surfactant being present in a concentration within the range of 0.01–1 percent by volume; such that said sub-surface layers are treated insitu to obtain additional strength and to obtain stabilized moisture content without requiring removal, admixture into homogeneous mass, replacement, and compaction.

2. The method of claim 1 wherein said particulate solids include said proportion of lime of about 33 percent by weight and said proportion of fly ash of about 67 percent by weight.

3. The method of claim 1 wherein said lime-fly ash slurry is prepared by adding an amount in the range of 2½–3 pounds of said particulate lime and fly ash per gallon of water.

4. The method of claim 4 wherein about 3 pounds of said particulate lime and fly ash are added per gallon of water and comprise about one pound of lime and about two pounds of fly ash.

5. The method of claim 1 wherein said lime-fly ash slurry includes a concentration of surfactant of at least 0.01 percent by volume.

6. The method of claim 1 wherein said concentration of surfactant is about 0.03 percent by volume.

7. The method of claim 1 wherein said lime-fly ash slurry is injected first in a substantially square pattern of locations at a predetermined spacing and subsequently is injected second at diagonally intermediate locations.

8. The method of claim 1 wherein said lime-fly ash slurry is injected first in a substantially square pattern of locations at a predetermined spacing and subsequently, a slurry of hydrated lime containing 25–60 percent by weight of the water of said lime is injected at diagonally intermediate locations.

9. The method of claim 1 wherein said method is employed as a method of stabilizing a railroad subgrade to perform one of controlling movement of water and building strength of said subgrade comprising injecting longitudinally along said railroad subgrade at a plurality of predetermined depths and at a plurality of predetermined lateral and longitudinal spacings said lime-fly ash slurry.

10. The method of claim 9 wherein said railroad subgrade has deep ballast pockets and said lime-fly ash slurry is prepared with a concentration of said particulate lime-fly ash in the range of 40–60 percent by weight of said water to displace water from said ballast pockets, reacting in situ to solidify and prevent re-entry of said water and strengthen said subgrade without requiring removal of said ballast pockets.

11. The method of claim 1 wherein said method is employed as a method of controlling flow of water in said subsurface layers with respect to a predetermined area and said lime-fly ash slurry is injected around the perimetral dimensions and boundaries of said area; said lime-fly ash slurry being prepared with a portion of said particulate lime and fly ash in the range of 25–35 percent by weight of water to flow into interstices, small fissures, and the like, react in situ and block the flow of water therepast.

12. The method of claim 1 wherein said lime-fly ash slurry is injected into a sloped earthen surface containing soil to stabilize said sloped surface.

13. The method of claim 12 wherein said lime-fly ash slurry is injected to a predetermined depth at predetermined spacings along said sloped surface to strengthen said soil and, as a further step, a lime slurry containing 25–30 percent by weight of water of lime is injected subsequently diagonally intermediate said injections of lime-fly ash slurry to displace water and decrease plasticity of said soil.

14. The method of claim 13 wherein said lime-fly ash slurry is injected first at the toe of said slope and longitudinally there along and is subsequently injected in successive longitudinal rows laterally upwardly on said slope.

15. In a railroad track comprising:
  a. subgrade having a top;
  b. ballast along said top of said subgrade;
  c. cross-ties at predetermined spacing on top of and in said ballast on top of said subgrade;
  d. a pair of rails carried by said cross-ties; the improvement comprising:
  e. a plurality of injected masses of lime and fly ash and reaction product disposed in fissures and any ballast pockets in sub-surface layers along said railroad tracks; said masses have a proportion of lime to fly ash in the range of 1:1 to 1:3; said masses of lime and fly ash having been formed by injecting a slurry of water, particulate lime, particulate fly ash and surfactant; said particulate lime and fly ash being present in the injected slurry as particulate solids in a proportion within the range of 25–60 percent by weight of said water; said particulate solids comprising lime in a proportion of 25–50 percent by weight and fly ash in the proportion of 75–50 percent by weight; and said surfactant being present in a concentration within the range of 0.0–1 percent by volume such that the sub-surface layers are treated insitu to obtain additional strength and to obtain stabilized moisture content without requiring removal, admixture into homogeneous mass, replacement, and compaction.

* * * * *